July 24, 1934.  J. K. LEIBING  1,967,892
STROBOSCOPE
Filed Feb. 1, 1933
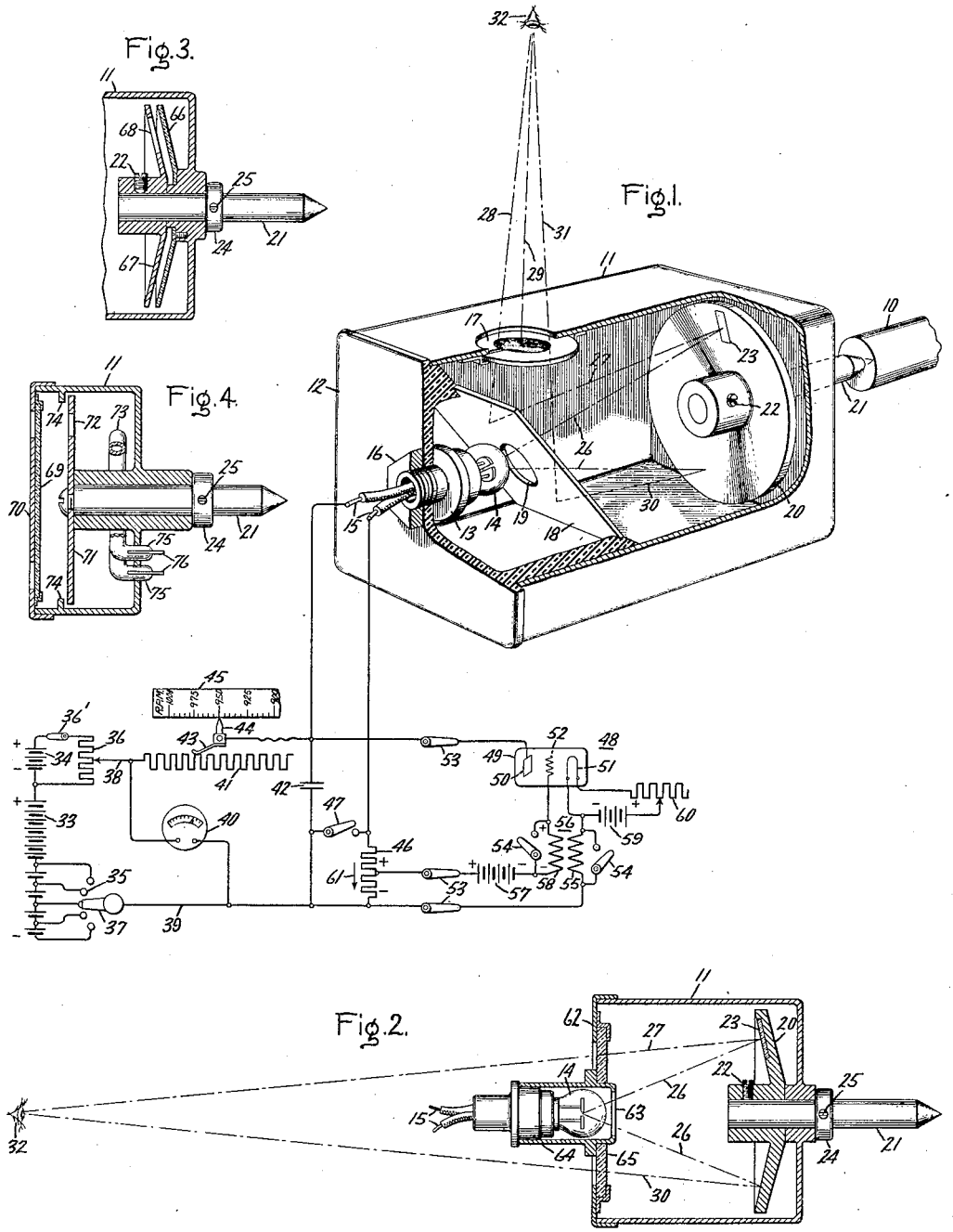
Inventor:
Joseph K. Leibing,
by Charles E. Tullar
His Attorney.

Patented July 24, 1934

1,967,892

UNITED STATES PATENT OFFICE 1,967,892

STROBOSCOPE

Joseph K. Leibing, Scotia, N. Y., assignor to General Electric Company, a corporation of New York Application February 1, 1933, Serial No. 654,685

21 Claims. (Cl. 175—183)

My invention relates to stroboscopes. The principal object of my invention is to provide a stroboscope which requires a small amount of stroboscopic light. An additional object of my invention is to provide a stroboscope which is small, rugged, inexpensive, and compact in construction, which is readily portable, which contains a minimum number of moving parts, and which has important operating advantages over the prior art stroboscopes.

In devices employing the stroboscopic principle, flashes of light are periodically projected on the rotatable or moving member being studied, or on some member driven thereby. So far as I know, in all prior art stroboscopes there is a diffusion of the stroboscopic light projected on the moving member being studied, and this diffused light mixes with whatever natural or artificial light is present where the test is conducted, hence in order to make the stroboscopic action visible without employing an excessive amount of stroboscopic light, it has generally been necessary to dim the ordinary daylight or artificial light present in the room where the tests on the rotatable or moving member were conducted, and in many cases it was necessary to conduct the tests in a dark room. This is a great disadvantage, which limits the use of the stroboscope, especially for measuring speed, because very often it is undesirable or impractical to employ an excessive amount of stroboscopic light, or to conduct the tests in a dimly lighted room or in a totally dark room. It therefore became desirable to provide a stroboscope which employs a small amount of stroboscopic light and which, nevertheless, can be used independently of and without interference from any illumination, natural or artificial, that may be present in the room where the tests are to be conducted on the rotating or moving member.

My invention provides such a stroboscope. My stroboscope does not employ diffused stroboscopic light, and the presence of natural or artificial light does not interfere with the viewing of the stroboscopic light, since the observer either has direct vision of the stroboscopic source of light or sees an image thereof each time the stroboscopic source of light illuminates the rotating member being tested, or some member driven thereby. My stroboscope, therefore, not only requires a much smaller amount of stroboscopic light than the prior art stroboscopes, but it requires the minimum amount of such light, and tests with it can be conducted anywhere regardless of the amount of natural or artificial light present.

Briefly described, a preferred embodiment of my stroboscope consists of a non-transparent casing having an annular transparent window, a rotating mirror within the casing driven in a circular path by the rotating member being tested, means for periodically projecting into the casing a column of light so that some of its rays impinge on the rotating mirror irrespective of the position in which the latter happens to be in its circular path, the rotating mirror being so mounted with respect to its axis of rotation that it reflects a beam of light which travels in the casing along a path different from that traveled by the column of light and which impinges on a stationary mirror within the casing. This stationary mirror is so positioned that it, in turn, reflects the beam of light impinging on it to the annular transparent window of the casing, hence effecting the passage out of the casing of the beam of light reflected by the rotating mirror irrespective of the position in which the latter happens to be in its circular path. My stroboscope also has adjusting means for varying the frequency at which the column of light is projected into the casing, a scale calibrated in speed units, and an index cooperating with the scale, either the scale or index being secured to the adjusting means. The beam of light emerging from the casing through the annular transparent window moves over the arc of a circle during the period that rays from a column of light impinge on the rotating mirror. This period is very short, hence the circumferential distance traveled by the emerging beam is very short. The observer manipulates the adjusting means until the successive beams of light emerge from the casing at the same place on the transparent window, hence giving the appearance of one stationary and permanent beam of light emerging from the casing, due to persistence of vision in the observer's eye. The observer then reads the speed of the rotating member being tested, by noting the position of the index on the scale. The only light emerging from the casing is that producing an image of the stroboscopic source of light in the observer's eye, as viewed in the mirrors, and since the reflection efficiency of a good mirror is nearly 100%, my stroboscope can be operated with the minimum amount of stroboscopic light, and tests can be conducted anywhere with it regardless of the amount of natural or artificial light present.

Any suitable means may be employed for periodically projecting a column of light into the casing, but I preferably employ for this purpose an electron discharge device known to the electrical art as a glow tube. For energizing this glow tube, I preferably provide a direct current energized circuit including a resistance connected in series with a condenser, this tube being connected across the condenser. This arrangement causes the glow tube to flash periodically, and by varying the value of the resistance connected in series with the condenser the frequency of the light flashes may be changed until the successive beams of light emerging from the casing appear to the observer as one stationary and permanent beam of light. The speed of the rotating member being tested is then indicated by an index which cooperates with a stationary scale calibrated in speed units, the index being secured to the resistance adjusting means.

I also provide suitable means for adjusting the duration of the light flashes of the glow tube in order to make it possible to obtain highly accurate speed measurements over any desired range. I also provide suitable means for discharging the condenser to a predetermined constant low voltage following each flash of the glow tube in order to make it possible to obtain highly accurate speed measurements with ordinary and expected changes in the characteristics of the glow tube due to age, temperature, and length of service. These two sets of adjusting means are so arranged that either one or both may be selectively employed.

My invention, however, will best be understood from the following description when considered in connection with the accompanying drawing, while those features of my invention which are believed to be novel and patentable are pointed out in the appended claims.

Fig. 1 of the drawing shows a wiring diagram of the electrical apparatus and a perspective view of the mechanical parts of a preferred embodiment of my stroboscope. Figs. 2, 3 and 4 show side elevation views of the mechanical parts of three other embodiments of my stroboscope, the wiring diagram of the electrical apparatus being omitted, as it is similar to that shown in Fig. 1. Similar parts in all figures are represented by the same reference numerals.

In Fig. 1, let 10 represent a shaft secured to a rotating member whose speed it is desired to measure, the rotating member not being shown, as its illustration is unnecessary to the description of my invention. A non-transparent casing is represented by 11, the casing having a cover 12 secured thereto by suitable means (not shown). A portion of the casing and its cover are broken away in order to give a clear view of the internal parts. A bracket 13 is secured to a glow tube represented by 14. Glow tube 14 is inside of casing 11, and consists of a glass bulb inside of which are two spaced apart, flat, semicircular electrodes supported by suitable electrically conducting stems which are connected to terminal leads 15. Glow tube 14 has a threaded base which projects through a hole in cover 12. A threaded nut 16 is screwed on the base of the tube, thus firmly securing the glow tube to the cover. The top wall of the casing has an aperture covered by a window 17. The central portion of window 17 is painted, or otherwise made non-transparent, so as to leave only a narrow annular section of the window transparent. Inside of casing 11 there is an inclined non-transparent wall 18 having a transparent section or opening 19. Wall 18 is so secured to the casing and its cover that the space within the casing is divided into two chambers. Wall 18 should either be a mirror or have a mirror secured thereto. In order to simplify the illustration, I will assume that wall 18 consists of a mirror having its silvered surface adjacent glow tube 14 and its light reflecting surface on the opposite side, and that its transparent section 19 is simply an aperture in the mirror. Opposite the light reflecting surface of mirror 18 is a disc 20 assembled on a spindle 21 which is rotatably mounted in a wall of casing 11. The hub of disc 20 is secured to spindle 21 by a screw 22. One end of spindle 21 projects outside of the casing and has a beveled end adapted to fit snugly into a similarly beveled center in shaft 10. When the beveled end of the spindle is pressed into the beveled center of the shaft, as shown in Fig. 1, the spindle will be driven by the shaft and both will rotate at the same speed. A small mirror 23 is so secured to disc 20 by suitable means (not shown) that its light-reflecting surface faces the light-reflecting surface of mirror 18. A thrust collar 24 (see Fig. 2) is secured by a screw 25 to spindle 21. In Fig. 2 it can be seen that adjacent parallel faces of disc 20 and collar 24 fit snugly against opposite faces of a boss on the wall of the casing, thus preventing appreciable lateral movement of spindle 21 and all parts carried thereby.

The glass bulb of glow tube 14 is filled with some gas, preferably neon, because this gas causes the tube to emit a very penetrating light when it is in operation. This glow tube has a critical lighting voltage and a lower critical extinction voltage. An explanation of these terms follows: With the glow tube extinguished and an increasing voltage impressed thereon, the glow tube does not light until the voltage impressed on it reaches a predetermined value, hereinafter called the "critical lighting voltage". If the voltage impressed on the tube is now decreased, its light becomes extinguished when the voltage has been reduced a predetermined amount below its "critical lighting voltage", this extinguishing voltage hereinafter being called "critical extinction voltage". Glow tube 14 is so positioned behind mirror 18 that when it is lighted it emits, through aperture 19, a column of light which is defined by two dot and dash lines 26. This column of light impinges on disc 20, on the end of spindle 21 inside of the casing, and some of its rays impinge on mirror 23, irrespective of the position in which the latter happens to be in its circular path. That portion of disc 20 and the end of spindle 21 on which the column of light impinges are painted jet black or otherwise treated so that they do not reflect any appreciable amount of the light which falls on them. From this it is obvious that only mirror 23 will reflect any appreciable amount of light when tube 14 is lighted, and, furthermore, this will occur irrespective of the position in which the latter happens to be in its circular path when tube 14 is lighted. The shape of mirror 23 is such that it will reflect a narrow beam of light. Mirror 23 is so mounted with respect to its axis of rotation, and mirror 18 is so inclined at an angle of less than 90 degrees with respect to the plane of window 17, that, irrespective of the position in which mirror 23 happens to be in its circular path, the beam of light reflected thereby will impinge on mirror 18 and the latter will in turn reflect this beam of light to the annular transparent section of the window so that it will pass out of casing 11. It is clear that the beam of light emerging from the casing moves over the arc of a circle during the period that glow tube 14 is lighted. Furthermore, the arrangement is such that the reflected beam of light passing out of the casing through window 17 has such a direction that it converges toward the center of the window and would intersect the axis of the window at a predetermined distance therefrom outside of the casing. For example, when mirror 23 is in the topmost position of its circular path, as shown in Fig. 1, the beam of light reflected thereby is represented by dot and dash line 27, this beam impinging on mirror 18. Mirror 18 in turn reflects beam 27 so that it is now represented by beam 28 passing through the annular transparent section of window 17 and out of the casing. It can be seen that the direction of beam 28 is such that it converges toward the center of window 17 and would intersect the axis of the window represented by dotted line 29 at a short distance from the window outside of the casing. Now, assume, for example, that mirror 23 has moved to its lowest position in its circular path. The beam of light reflected by mirror 23 will then be represented by dot and dash line 30, this beam impinging on mirror 18. Mirror 18 in turn reflects beam 30 so that it is now represented by beam 31 passing through the annular transparent section of window 17 and out of the casing. It can be seen that the direction of beam 31 is such that it converges toward the center of window 17 and would intersect axis 29 of the window at the same point that it would be intersected by beam 28. The same will be true of all positions of mirror 23 in its circular path, hence it is clear that if glow tube 14 is caused to flash periodically when mirror 23 is rotating, the successive beams of light coming out of the casing will converge towards a common point outside of the casing. From this it should be obvious that when the observer moves his head into such a position that his eye, which is represented by 32, is at this common point, he will see the image of glow tube 14 every time it lights, irrespective of the position in which the rotating mirror happens to be in its circular path.

Any suitable apparatus may be employed for periodically energizing glow tube 14 and for controlling the frequency of its flashes. I will now describe one form of such apparatus. I employ a suitable direct current source of the proper voltage to operate the glow tube. Thus, assume, for example, that the "critical lighting voltage" of tube 14 is 100 volts, and that its "critical extinction voltage" is 90 volts. In this case, a 110 volt direct current source will be satisfactory. In order to obtain accurate speed measurements of shaft 10, it is necessary that the voltage of the D. C. source remain constant at the correct value during the time the measurements are being made. Therefore, I have for the sake of illustration shown the D. C. source as consisting of two sets of batteries connected in series so that their voltages aid each other. These two sets of batteries are represented by 33 and 34, respectively. Battery set 33 supplies most of the voltage, and battery set 34 supplies only a small voltage. An arcuate bank of contacts represented by 35 are severally connected between some of the end cells of battery set 33, and a low resistance 36 is connected in series with a switch 36′ across battery set 34. A pivotally mounted switch blade 37 is centrally disposed with respect to contacts 35 and is adapted to engage one contact after another when it is moved in one or the other direction. A lead 38 is adjustably connected to resistance 36 and a lead 39 is connected to switch blade 37. An indicating voltmeter 40 is connected across leads 38 and 39. A resistance 41 is connected in series with a condenser 42 across leads 38 and 39. The amount of resistance 41 connected in series with condenser 42 may be varied by moving a contact 43 which is arranged to slide over this resistance. Contact 43 carries an index 44 which cooperates with a stationary scale 45 that is marked in speed units. The speed units shown on scale 45 are only for illustrative purposes, since any other indicia may be employed. Glow tube 14 is connected in series with a resistance 46 across condenser 42. A switch 47 is provided for short-circuiting resistance 46 so that by closing this switch the glow tube will be connected directly across the condenser.

If it is desired to control the duration of the flashes of glow tube 14 and to control the voltage to which the condenser discharges following each flash, then resistance 46 and the following described apparatus will also be employed. An electron discharge tube 48 consists of a glass bulb 49 in which there are an anode 50, a cathode 51, and a grid 52. Tube 48 may be of the vapor electric discharge type, or of the high vacuum pure electron discharge type, depending on the mode of operation, as explained in detail later. Anode 50 and cathode 51 are connected to opposite sides of condenser 42 by switches 53. The connection of cathode 51 to the condenser may be direct by closing a switch 54 or it may be connected in series with a primary winding 55 of a transformer 56 to the condenser by leaving this switch open. Grid 52 is connected in series with a battery 57 and another switch 53 to a predetermined point of resistance 46. The connection of grid 52 to battery 57 may be direct by closing another switch 54, or it may be connected in series with a secondary winding 58 of transformer 56 by leaving this switch open. A battery 59 is connected in series with an adjustable resistance 60 across cathode 51 for heating the latter sufficiently to emit a stream of electrons.

My stroboscope may be operated in accordance with any one of the three following methods:

1. Employing the apparatus for energizing glow tube 14 and for controlling the frequency of its flashes, but not employing discharge tube 48 for controlling the duration of the flashes or for discharging the condenser to a predetermined constant low voltage following each flash of the glow tube.

2. Employing the apparatus for energizing glow tube 14 and for controlling the frequency of its flashes, and also employing discharge tube 48 for controlling the duration of the flashes, the discharge tube being in operation only during the period the glow tube is lighted.

3. Same as No. 2 method, except that discharge tube 48 remains in operation for a predetermined period after the glow tube is extinguished to discharge the condenser to a predetermined constant low voltage following each flash of the glow tube.

I will now describe the operation of my stroboscope in accordance with number 1 method. Close switch 47 and open switches 53. Discharge tube 48 will now be disconnected from condenser 42 and glow tube 14 will be connected directly across the condenser. Assume that scale 45 has been calibrated with discharge tube 48 disconnected from condenser 42, with glow tube 14 having a "critical lighting voltage" of 100 volts and a "critical extinction voltage" of 90 volts and with a D. C. source of 110 volts employed. Further, assume that shaft 10 is rotating at 950 R. P. M., and that it is desired to measure the speed of the shaft by means of my stroboscope. Switch blade 37, which is normally disconnected from contacts 35, will be brought into engagement with that contact 35 which brings the voltage across leads 38 and 39 as nearly as possible to 110 volts, and switch 36', which is normally open, will be closed. Lead 38 will then be moved across resistance 36 until voltmeter 40 indicates 110 volts, and this voltage will be maintained by suitably adjusting lead 38. At the instant resistance 41 and condenser 42 are connected to the D. C. source, the voltage across the condenser is practically zero, and the voltage across the resistance is practically equal to the voltage across leads 38 and 39. As the D. C. source charges the condenser, the voltage across the latter increases, and when this voltage reaches 100 the "critical lighting voltage" of glow tube 14 is reached and the tube lights. The glow tube then provides a discharge path for the condenser and the latter discharges therethrough until its voltage decreases to 90, which, being the "critical extinction voltage" of the tube, causes extinction of its light. The D. C. source then begins to charge up the condenser again, and the previously recited cycle is repeated. The time required for the D. C. source to charge the condenser so as to increase its voltage from 90 to 100 may be varied by adjusting the amount of resistance 41 connected in series with condenser 42; hence, by moving contact 43, the frequency of the light flashes of glow tube 14 may be varied. Contact 43 is now moved until the successive beams of light emerge from the casing at the same place on the transparent section of window 17. This will occur when glow tube 14 flashes 950 times a minute. Mirror 23 will, therefore, be in the same position every time the glow tube flashes, thus producing in the observer's eye 950 images of the glow tube. Due to the phenomena known as persistence of vision, each image is retained by the eye for an appreciable period after each flash of the glow tube, and since the next image appears before the preceding one has faded from the eye, the successive beams of light emerging from the casing appear as one stationary and permanent beam of light to the observer's eye. Index 44 then indicates the speed of shaft 10 on scale 45, assuming that the scale had previously been suitably calibrated, hence the observer can read the correct speed of shaft 10 directly from scale 45.

I preferably employ a neon gas-filled glow tube, such as glow tube 14, because it emits a very penetrating light, because it operates practically without any time lag, i. e., it is practically instantaneously responsive in operation when one or the other of the previously mentioned critical voltages is impressed thereon, and because it has a very low thermal capacity which prevents it from emitting any appreciable amount of light as soon as it is extinguished. It is, therefore, readily possible to employ a very small glow tube and still enable the observer to see clearly the image of the glow tube. This in turn makes it possible to employ a small resistance 41 and a small condenser 42. In addition, casing 11 and all parts associated therewith may readily be made small and be compactly arranged. Furthermore, since batteries 33 and 34 may be discarded when a suitable D. C. source is available, it is possible to arrange the remaining electrical apparatus within a small portable receptacle. It should therefore be obvious that my invention provides a stroboscope which requires the minimum amount of stroboscopic light, which is small, rugged, inexpensive, and compact in construction, which is readily portable, which contains only one rotating member, and which enables tests to be conducted anywhere irrespective of the amount of natural or artificial light present where the stroboscopic test is conducted. Furthermore, my stroboscope does not employ a mechanical contactor for effecting the operation of the glow tube and for controlling the frequency of its flashes; but, instead, it employs a simple electrical circuit whose constants may readily be varied for accomplishing these results. It is obvious that this is an advantage, because the operation of the stroboscope will be more reliable and the maintenance expense thereof will be reduced.

From the previously described operation of my stroboscope it is clear that glow tube 14 remains lighted during the period condenser 42 discharges to lower its voltage from 100 to 90, and that mirror 23 is rotating during this period. This period is usually so small that with low and medium peripheral velocities of mirror 23 the latter will not move any appreciable distance during the period, hence the observer will have no difficulty in adjusting contact 43 so that the successive beams of light emerging from the casing will appear to him as one stationary beam. With high peripheral velocities of mirror 23 the reflected beams of light emerging from the casing through window 17 may be drawn out over a longer arc than is desirable in order to obtain the best stroboscopic measurements. This disadvantage may be overcome by operating my stroboscope in accordance with either number 2 or number 3 method. I will first describe number 2 method, because number 3 method involves an additional feature which will be described in detail later.

To operate according to number 2 method, open switch 47 and close switches 53 and 54. Again make the previously described assumptions with respect to the voltage of the D. C. source and the characteristics of the glow tube. Also assume that shaft 10 is rotating at 950 R. P. M., and that it is desired to measure its speed. Tube 48 should be of the high vacuum pure electron discharge type, i. e., its bulb 49 should be highly evacuated and should not contain any appreciable amount of gas or mercury vapor. The negative terminal of battery 57 is connected to grid 52, and its positive terminal is connected through resistance 46 to cathode 51, hence the battery impresses a biasing voltage across the grid and cathode. The voltage of the battery is such that this biasing voltage is of sufficient magnitude to make tube 48 substantially electrically non-conducting during the charging period of condenser 42 prior to the lighting of glow tube 14. It is clear that during the charging and discharging of condenser 42, its upper plate will be positive in polarity and its lower plate will be negative in polarity; hence, when tube 14 lights and current flows through resistance 46, the direction of this current will be represented by arrow 61 adjacent the resistance. During this current flow there is a voltage drop across that portion of resistance 46 which is connected in series with battery 57 across cathode 51 and grid 52, and the polarities of this voltage drop are as shown by the polarity marks adjacent this portion of the resistance. This voltage drop opposes the voltage of battery 57 and is sufficient to make ineffective the negative biasing voltage impressed on cathode 51 and grid 52 by the battery. It is clear that at the instant glow tube 14 lights, the discharge tube 48 becomes electrically conducting and remains so until the glow tube is extinguished. Current from condenser 42, therefore, flows through discharge tube 48 during the period glow tube 14 is lighted, hence draining the condenser more rapidly than if current from the condenser flowed only through the glow tube, and thereby decreasing the period of the flashes of the glow tube. By choosing a discharge tube 48 having suitable characteristics, and choosing a suitable value of that portion of resistance 46 connected in series with battery 57 across the cathode and grid of this tube, it is readily possible to decrease the period of the flashes of the glow tube to a value just sufficient to produce an image of the glow tube in the observer's eye. From this is should be obvious that it will now be readily possible to adjust contact 43 so that the beams of light emerging from the casing appear stationary to the observer even when the mirror is rotating at high peripheral velocities, thus making it possible to obtain highly accurate speed measurements of shaft 10 over a very wide speed range. It should be understood that in order to have index 44 indicate the correct speed of shaft 10 on scale 45, the latter should be calibrated with the apparatus operating in the manner above described.

In the previously described methods of operation, the discharging of condenser 42 ceases when the "critical extinction voltage" is impressed on glow tube 14. It frequently occurs that the "critical extinction voltage" of a glow tube changes with its age, temperature, and length of service, thus changing the time required for the condenser to charge up between flashes of the tube. This changes the frequency of the flashes and produces erroneous speed indications unless scale 45 is frequently recalibrated. I overcome this disadvantage by discharging the condenser after each flash of the glow tube to such an extent that its voltage is considerably below the "critical extinction voltage" of the tube. The ordinary and expected change in the "critical extinction voltage" of the glow tube will now be a very small fraction of the difference between the voltage of the condenser when it ceases discharging and the "critical lighting voltage" of the glow tube, hence at most, this change will cause only a negligibly small error in the speed indications of index 44 and it will be unnecessary to recalibrate scale 45 frequently. This discharging of the condenser is carried out in accordance with my number 3 method of operation, which I will now describe.

To operate according to number 3 method, open switch 47, close switches 53, and open switches 54. It is seen that this is similar to number 2 method of operation, except that switches 54 are now open, thus introducing transformer 56 into the circuit of discharge tube 48. When condenser 42 simultaneously starts discharging through glow tube 14 and discharge tube 48, there is a current surge through primary winding 55 of the transformer, because it is connected in series with the anode and cathode circuit of tube 48, hence a surge voltage is induced in secondary winding 58 of the transformer. The transformer windings are so arranged that the polarities of the voltage induced in its secondary winding 58 are as shown by the polarity marks adjacent thereto. This induced surge voltage opposes the voltage of battery 57 and assists the voltage drop across that portion of resistance 46 which is connected in series with the battery to tube 48, thus producing two important effects. First, it increases the magnitube of the curent flow from condenser 42 through tube 48 during the period the glow tube is lighted, thus further decreasing the period of the light flashes of the glow tube. By suitably proportioning resistance 46 and the windings of transformer 56, it is readily possible to obtain light flashes of the glow tube whose periods are just sufficient to produce an image of the glow tube in the observer's eye, and, therefore, by suitably adjusting contact 43 it is readily possible to make the beams of light emerging from the casing appear stationary to the observer even when mirror 23 is revolving at high peripheral velocities. The second important effect of the induced surge voltage in secondary winding 58 is that it causes tube 48 to remain electrically conducting even after glow tube 14 is extinguished and no current flows through resistance 46. This is due to the fact that a portion of the energy in the anode and cathode circuit of tube 48 is fed back into its grid circuit through transformer 56 in such a manner that the current flowing through the tube continually increases from the instant it becomes electrically conducting in response to the lighting of glow tube 14 until the voltage across condenser 42 is a predetermined amount below the "critical extinction voltage" of the glow tube. This feed back of energy, or "regeneration", as it is usually called, and the results produced thereby may be explained as follows: At the instant tube 48 becomes electrically conducting there is a current surge through primary winding 55 of transformer 56 which causes a surge voltage to be induced in secondary winding 58. The magnitude of this induced surge voltage and its polarities, as shown by the polarity marks adjacent secondary winding 58, are such that it causes a substantial increase in the current flowing through the anode and cathode circuit of tube 48. This increases the current flowing through primary winding 55, which increases the transformer flux, hence increasing the voltage induced in secondary winding 58 and thereby further increasing the potential of grid 52 above that of cathode 51. The increased grid potential, in turn, causes an increase in the current flowing through the cathode and the anode circuit of tube 48, and the increasing of this current again reacts through transformer 56 to increase the grid potential, thus further increasing the current flowing through the tube. Due to the amplifying action of tube 48, a given increase in the potential of its grid above that of its cathode causes the current flowing through its anode and cathode circuit to increase several times as much as that increase in current which caused the increase in grid potential. This amplifying action causes a rapid increase in the current flowing through tube 48 until the voltage of condenser 42 decreases to a predetermined value even though the condenser voltage is continually decreasing. When the condenser voltage decreases below this predetermined value the current flowing through tube 48 begins to decrease, notwithstanding the regenerative action above described, hence causing a reversal in the polarities of the voltage induced in secondray winding 58. The induced voltage will then aid the voltage of battery 57, thus immediately causing tube 48 to become non-conducting and stopping the current flow through the tube. The biasing voltage of battery 57 then maintains tube 48 non-conducting until the next time glow tube 14 lights. By choosing tube 48 and transformer 56 of suitable characteristics, it is possible to have the discharge of condenser 42 through tube 48 continue after each flash of the glow tube until the condenser voltage is considerably below the "critical extinction voltage" of the glow tube.

The same results may be obtained without employing transformer 56. Thus, assume that switches 54 are closed and all other connections are as just described under number 3 method of operation. Tube 48 should now be of the vapor electric discharge type, i. e., its bulb should be filled with some gas or with mercury vapor at a low pressure. This tube has the following two important characteristics. First, as soon as the biasing voltage across its cathode and grid is made ineffective, ionization of its gas or mercury vapor takes place and it becomes electrically conducting, hence passing current. However, after current starts to flow the grid has no appreciable effect on it, i. e., the grid cannot stop the current flow after it has started. The grid can again gain control of the tube to prevent the current from starting only after the current flow through the tube ceases long enough for the gas or mercury vapor to deionize. Second, all other factors being equal, the tube will pass a much greater current than a high vacuum pure electron discharge tube, this being due to the well known phenomena of gas amplification. From this it will be clear that no current will flow from condenser 42 through tube 48 up to the instant glow tube 14 lights, and from this instant current will flow from the condenser through tube 48 not only during the period the glow tube is lighted, but will continue to flow after the glow tube is extinguished and until the condenser voltage is almost zero. When the condenser voltage is almost zero, then the current through tube 48 is also almost zero, the gas or mercury vapor in the tube deionizes, and then the biasing voltage of battery 57 reasserts itself and makes this tube substantially electrically non-conducting until glow tube 14 lights again. It should be understood that in order to have index 44 indicate the correct speed of shaft 10 on scale 45 in each case, the latter should be calibrated with the apparatus operating in the manner in which it is intended to operate when used.

I have described my stroboscope as being used for measuring the speed of a rotating member. However, it may be used otherwise, as, for example, for measuring the slip of an induction motor. Thus, assume that 10 represents the shaft of an induction motor which has a synchronous speed of 900 R. P. M., and which is sufficiently loaded so that it is rotating at 880 R. P. M. Contact 43 will then be moved until index 44 points to 900 on scale 45. Glow tube 14 will then flash 900 times per minute, whereas mirror 23 will rotate at 880 R. P. M., hence to the observer it will appear as a beam of light emerging from the casing and rotating at 20 R. P. M., around the annular transparent section of window 17. However, 20 R. P. M. is the slip of the motor. Therefore, all the observer has to do is to set index 44 to indicate the synchronous speed of the motor and count the number of revolutions that the beam of light emerging from the casing appears to make during one minute.

It should be obvious that the apparatus I have disclosed for controlling the duration of the light flashes of the glow tube and for discharging the condenser to a predetermined constant low voltage following each flash, may be used with other types of stroboscopes than I have shown, and, therefore, I not only claim this apparatus as an integral part of my invention, but also as a distinct feature thereof.

When the end of a horizontal shaft whose speed is to be measured is at or below the observer's waist, then the arrangement of casing 11 with its mirror 18 and window 17, as shown in Fig. 1, provides a very convenient equipment, because the observer can comfortably hold the casing in his hands and look down at window 17. It is clear that this arrangement is also very convenient for measuring the speed of a vertical shaft whose end is nearly on a level with the observer's head.

It is frequently desirable to measure the speed of a horizontal shaft whose end is nearly on a level with the observer's head, and to measure the speed of a vertical shaft whose end is at or below the observer's waist. Fig. 2 shows an arrangement which enables the convenient taking of these measurements. In Fig. 2, I do not employ a stationary mirror inside of casing 11. This casing has a cover 62 which is provided with an aperture 63 opposite disc 20. Behind aperture 63 is placed the glow tube 14, which is surrounded by a non-transparent receptacle 64 secured to the cover. The glow tube is so positioned that when it is lighted it emits through aperture 63 a column of light which impinges on disc 20 and mirror 23 as explained in connection with Fig. 1, the column of light being defined by dot and dash lines 26. A window 65 is so secured to the cover that only a narrow annular section of it is visible. Mirror 23 is so mounted that the beam of light reflected by it will impinge on the visible annular section of window 65, irrespective of the position in which it happens to be in its circular path; hence the reflected beam of light will always pass out of the casing. Furthermore, mirror 23 is so mounted with respect to its axis of rotation that the beam of light reflected by it converges toward the axis of rotation of spindle 21 and would intersect this axis outside the casing at a predetermined distance from window 65. It is clear that if glow tube 14 is caused to flash periodically when mirror 23 is rotating, the successive beams of light coming out of the casing would pass through a common point outside of the casing, and if the observer's eye 32 is at this common point, as shown in Fig. 2, he will see a beam of light from the glow tube every time the latter lights, irrespective of the position in which the mirror happens to be in its circular path. It should, therefore, be obvious that the embodiment shown in Fig. 2 is capable of producing the results described in connection with Fig. 1. and that it has all of the advantages of the arrangement shown in Fig. 1.

In the embodiment shown in Fig. 3, I do not employ a rotating mirror but I obtain the equivalent of a rotating mirror by providing a stationary mirror 66 behind a rotatable disc 67 secured to spindle 21, the disc having an aperture 68 whose dimensions are approximately the same as those of rotating mirror 23 in Figs. 1 and 2. The diameter of mirror 66 is such that a portion thereof is uncovered by aperture 68 irrespective of the position in which the latter happens to be in its circular path. The arrangement of the remaining parts associated with casing 11 may be as shown in Fig. 1 or Fig. 2. It is clear that every time glow tube 14 lights, a column of light will impinge on disc 67 and some of its rays will pass through aperture 68 and impinge on a small section of mirror 66. That portion of disc 67 and the end of spindle 21 on which the column of light impinges are painted jet black or otherwise treated so that they do not reflect any appreciable amount of light which falls on them. Mirror 66 is so inclined with respect to the axis of rotation of spindle 21 that it reflects a beam of light back through aperture 68 which travels in the casing along a path different from that traveled by the column of light. This reflected beam of light is then conducted out of the casing by mirror 18 and window 17 as shown in Fig. 1, or by window 65 as shown in Fig. 2. It should, therefore, be obvious that the embodiment shown in Fig. 3 is capable of producing all the results described in connection with the arrangements shown in Figs. 1 and 2 and that it has all the advantages of these arrangements.

In the embodiment shown in Fig. 4, the observer has direct vision of the stroboscopic source of light instead of an image thereof by means of one or more mirrors. In this figure, casing 11 has secured thereto a window 69 whose central portion is covered by an opaque body 70 or otherwise made non-transparent, so as to leave only a narrow annular section of the window transparent. Adjacent this window is a rotatable disc 71 secured to spindle 21, this disc having a narrow aperture 72 whose dimensions are approximately the same as those of rotating mirror 23 in Figs. 1 and 2, and whose inner and outer peripheral edges are approximately in line with those of the annular transparent section of window 70 in Fig. 4. Inside of casing 11 in Fig. 4 there is a stationary electric glow tube 73 positioned behind disc 71. This glow tube nearly surrounds the bearing for spindle 21, so that when it is lighted it projects a column of light in the casing which impinges on the adjacent face of disc 71. The casing has stationary baffles 74 adjacent the rim of the disc to prevent any appreciable amount of light from the glow tube going around the periphery of the disc to the other side thereof. It is clear, however, that some of the rays of light from the glow tube will pass through aperture 72 of the disc irrespective of the position in which the aperture happens to be in its circular path when the glow tube is lighted, and these rays of light will then pass out of the casing through that part of the annular transparent section of window 69 which happens to be opposite aperture 72. It follows that every time glow tube 73 flashes, a beam of light will pass directly therefrom out of the casing irrespective of the position in which disc aperture 72 happens to be in its circular path. The drawing shows that a part of the glow tube is broken away. This has been done to improve the view, but it will be understood that actually the tube is one continuous piece between its two sealed ends 75 that protrude from the casing. Each end of the tube has an electrode 76 projecting partly into and partly out of the tube, the connections to the tube being made to these outwardly projecting ends of the electrodes. Except for its shape and the spacing of the electrodes, the glow tube 73 is similar to glow tube 14 in Fig. 1, and operates in the same manner as the latter; hence, it may be connected to the electrical apparatus as shown in Fig. 1.

When employing the embodiment shown in Fig. 4 to measure the speed of the rotating body driving spindle 21, the observer moves contact 43 until the successive beams of light emerge from the casing at the same place on the annular transparent section of window 69, hence appearing to the observer's eyes as a stationary and permanent beam of light. This will occur when the frequency of the light flashes of glow tube 73 is the same as the frequency of rotation of aperture 72 of the disc. Index 44 then indicates on scale 45 the correct speed of the rotating member driving spindle 21, assuming that the scale had previously been suitably calibrated, hence the observer can read the speed directly from the scale 45. It should now be obvious that the embodiment shown in Fig. 4 is capable of producing all the results described in connection with the arrangements shown in Figs. 1, 2 and 3.

Instead of employing a D. C. energized circuit including a variable resistance connected in series with a condenser for causing periodic flashing of glow tube 14 or 73, it is obvious that I may employ for this purpose other suitable arrangements, as, for example, a variable frequency A. C. source in combination with the arrangement illustrated in United States Patent No. 1,728,003, Nickle, September 10, 1929, or in combination with the arrangement illustrated in United States Patent No. 1,799,993, Staege, April 7, 1931.

In accordance with the provisions of the Patent Statutes, I have described the principles of operation of my invention, together with the apparatus which I now consider to represent the best embodiments thereof, but I desire to have it understood that the apparatus shown and described is only illustrative and that the invention may be carried out by other means.

What I claim as new and desire to secure by Letters Patent of the United States, is:

1. A stroboscope comprising a non-transparent casing, a spindle rotatably mounted in said casing, a rotatable disc within said casing driven by said spindle, means for periodically projecting a column of light into said casing which impinges on said disc, said casing and disc being provided with means for effecting the passage of a beam of light from said column of light out of the casing each time a column of light is projected thereinto, with this beam of light moving over the arc of a circle in synchronism with the rotation of said disc as it emerges from said casing during the period a column of light is impinging on said disc, and means for varying the frequency at which said column of light is projected into said casing.

2. A stroboscope comprising a non-transparent casing, a spindle rotatably mounted in said casing, a rotatable disc within said casing driven by said spindle, a mirror within said casing, means for periodically projecting a column of light into said casing, said disc and mirror being so arranged that rays from said column of light impinge on both and the mirror reflects a beam of said light which moves over the arc of a circle as it leaves the mirror and travels in said casing along paths which are different from that traveled by said column of light, said casing being provided with means for conducting said reflected beam of light out of the casing so that it moves over the arc of a circle in synchronism with the rotation of said disc as it emerges from said casing during the period that rays from the column of light impinge on said disc and mirror, and means for varying the frequency at which said column of light is projected into said casing.

3. A stroboscope comprising a non-transparent casing, a spindle rotatably mounted in said casing, a mirror within said casing driven in a circular path by said spindle, means for periodically projecting a column of light into said casing so that some of its rays impinge on said mirror irrespective of the position in which the latter happens to be in its circular path, said mirror being so mounted that it reflects a beam of light which travels in said casing along a different path from that traveled by said column of light, said casing being provided with means for conducting said reflected beam of light out of the casing irrespective of the position in which said mirror happens to be in its circular path, and means for varying the frequency at which said column of light is projected into said casing.

4. A stroboscope comprising a non-transparent casing, a spindle rotatably mounted in said casing, a mirror within said casing driven in a circular path by said spindle, means for periodically projecting a column of light into said casing so that some of its rays impinge on said mirror irrespective of the position in which the latter happens to be in its circular path, said mirror being so mounted that it reflects a beam of light which travels in said casing along a different path from that traveled by said column of light, said casing being provided with means for conducting said reflected beam of light out of the casing irrespective of the position in which said mirror happens to be in its circular path, the arrangement of the last-mentioned means and the mounting of said mirror being such that the successive reflected beams of light coming out of the casing converge towards a common point outside of the casing, and means for varying the frequency at which said column of light is projected into said casing.

5. A stroboscope comprising a non-transparent casing, a spindle rotatably mounted in said casing, a rotatable disc within said casing driven by said spindle, a mirror so secured to said disc that it revolves in a circular path around the axis of rotation of said disc, means for periodically projecting a column of light into said casing so that it impinges on said disc with some of its rays also impinging on said mirror irrespective of the position in which the latter happens to be in its circular path, the character of the surface of said disc on which said column of light impinges being such that substantially none of this light is reflected therefrom, whereas said mirror is so mounted that it reflects a beam of light which travels in said casing along a different path from that traveled by said column of light, said casing being provided with means for conducting said reflected beam of light out of the casing irrespective of the position in which said mirror happens to be in its circular path, and means for varying the frequency at which said column of light is projected into said casing.

6. A stroboscope comprising a non-transparent casing having a wall provided with a transparent section, a spindle rotatably mounted in said casing, a mirror within said casing driven in a circular path by said spindle, a source of light so positioned adjacent said wall that when energized it projects a column of light into said casing through said transparent section with some of its rays impinging on said mirror irrespective of the position in which the latter happens to be in its circular path, said mirror being so mounted that it reflects a beam of light which travels in said casing along a different path from that traveled by said column of light, said casing being provided with means for conducting said reflected beam of light out of the casing so that it moves over the arc of a circle as it emerges from the casing during the period rays from a column of light impinge on said mirror, means for periodically energizing said source of light, and means for varying the frequency at which said source of light is energized.

7. A stroboscope comprising a non-transparent casing having a wall provided with a transparent section, a spindle rotatably mounted in said casing, a mirror within said casing driven in a circular path by said spindle, a source of light so positioned adjacent said wall that when energized it projects a column of light into said casing through said transparent section with some of its rays impinging on said mirror irrespective of the position in which the latter happens to be in its circular path, means for periodically energizing said source of light, said mirror being so mounted that it reflects a beam of light which travels in said casing along a different path from that traveled by said column of light, said casing being provided with means for conducting said reflected beam of light out of the casing so that it moves over the arc of a circle as it emerges from the casing during the period rays from the column of light impinge on said mirror, the arrangement of the last-mentioned means and the mounting of said mirror being such that the successive reflected beams of light coming out of the casing converge towards a common point outside of the casing, and means for varying the frequency at which said source of light is energized.

8. A stroboscope comprising a non-transparent casing having two adjacent walls which are inclined to each other at an angle of less than 90 degrees, one of said walls having an annular transparent section and the other of said walls having a stationary plane mirror provided with a transparent section, a spindle rotatably mounted in said casing, a rotatable mirror within said casing driven in a circular path by said spindle with its light reflecting surface facing the light reflecting surface of said plane mirror, a source of light so positioned adjacent the transparent section of said plane mirror that when energized it projects a column of light into said casing with some of its rays impinging on said rotatable mirror irrespective of the position in which the latter happens to be in its circular path, said mirrors being so mounted that the rotatable mirror reflects a beam of light to the light reflecting surface of the plane mirror which is in turn reflected by the latter to the annular transparent section of said casing, means for periodically energizing said source of light, and means for varying the frequency at which said source of light is energized.

9. A stroboscope comprising a non-transparent casing having a wall provided with two concentric transparent sections, a spindle rotatably mounted in said casing, a mirror within said casing driven in a circular path by said spindle with its light reflecting surface facing said transparent sections, a source of light so positioned behind the inner one of said transparent sections that when energized it projects a column of light into said casing with some of its rays impinging on said mirror irrespective of the position in which the latter happens to be in its circular path, said mirror being so mounted that it reflects a beam of light to the outer one of said transparent sections, means for periodically energizing said source of light, and means for varying the frequency at which said source of light is energized.

10. A stroboscope comprising a non-transparent casing, a spindle rotatably mounted in said casing, a rotatable disc within said casing driven by said spindle, said disc having a narrow radial transparent section, means for periodically projecting a column of light into said casing which impinges on said disc, the character of the disc surface on which said column of light impinges being such that substantially none of this light is reflected therefrom, a stationary mirror so positioned behind said disc that rays from said column of light pass through said transparent section and impinge on a segment of the mirror and the latter reflects a beam of light through said transparent section which travels along a path different from that traveled by said column of light, said casing being provided with means for conducting said reflected beam of light out of the casing irrespective of the position in which said radial transparent section happens to be in its circular path, and means for varying the frequency at which said column of light is projected into said casing.

11. A stroboscope comprising a non-transparent casing provided with an annular transparent window, a spindle rotatably mounted in said casing, means for periodically projecting a column of light into said casing, a rotatable disc within said casing so mounted that one side thereof is adjacent to said window and said column of light impinges on the other side thereof, said disc being driven by said spindle and being provided with a narrow radial transparent section so disposed that a beam from said column of light passes therethrough and out of said casing through said transparent window, and means for varying the frequency at which said column of light is projected into said casing.

12. A stroboscopic tachometer comprising a non-transparent casing having a wall provided with a transparent section, a spindle rotatably mounted in said casing, a mirror within said casing driven in a circular path by said spindle, an electric glow tube so positioned adjacent said wall that when energized it projects a column of light into said casing through said transparent section with some of its rays impinging on said mirror irrespective of the position in which the latter happens to be in its circular path, said tube having a critical lighting voltage and a lower critical extinction voltage, said mirror being so mounted that it reflects a beam of light which travels in said casing along a different path from that traveled by said column of light, said casing being provided with means for conducting said reflected beam of light out of the casing so that it moves over the arc of a circle as it emerges from the casing during the period rays from a column of light impinge on said mirror, a direct current energized circuit including a resistance connected in series with a condenser, means for connecting said glow tube across said condenser, and means for adjusting the amount of said resistance connected in series with said condenser.

13. A stroboscopic tachometer comprising a non-transparent casing having two adjacent walls which are inclined to each other at an angle of less than 90 degrees, one of said walls having an annular transparent section and the other of said walls having a stationary plane mirror provided with a transparent section, a spindle rotatably mounted in said casing, a rotatable mirror within said casing driven in a circular path by said spindle with its light reflecting surface facing the light reflecting surface of said plane mirror, an electric glow tube so positioned adjacent the transparent section of said plane mirror that when energized it projects a column of light into said casing with some of its rays impinging on said rotatable mirror irrespective of the position in which the latter happens to be in its circular path, said mirrors being so mounted that the rotatable mirror reflects a beam of light to the light reflecting surface of the plane mirror which is in turn reflected by the latter to the annular transparent section of said casing, said glow tube having a critical lighting voltage and a lower critical extinction voltage, a direct current energized circuit including a resistance connected in series with a condenser, means for connecting said glow tube across said condenser, and means for adjusting the amount of said resistance connected in series with said condenser.

14. A stroboscopic tachometer comprising a non-transparent casing having a wall provided with two concentric transparent sections, a spindle rotatably mounted in said casing, a rotatable mirror within said casing driven in a circular path by said spindle with its light reflecting surface facing said transparent sections, an electric glow tube so positioned behind the inner one of said transparent sections that when energized it projects a column of light into said casing with some of its rays impinging on said mirror irrespective of the position in which the latter happens to be in its circular path, said mirror being so mounted that it reflects a beam of light to the outer of said transparent sections, said glow tube having a critical lighting voltage and a lower critical extinction voltage, a direct current energized circuit including a resistance connected in series with a condenser, means for connecting said glow tube across said condenser, and means for adjusting the amount of said resistance connected in series with said condenser.

15. In combination, a direct current energized circuit including a resistance connected in series with an electrical energy storing device, an electron discharge device connected across said energy storing device, said discharge device being substantially electrically non-conducting until a voltage of a predetermined value is impressed thereon, the voltage of said circuit being sufficiently high to charge said energy storing device until the voltage impressed on said discharge device equals said predetermined value, an electrically conducting electroresponsive device connected across said energy storing device, biasing means for making said electroresponsive device substantially electrically non-conducting, and means responsive to a flow of current through said discharge device for making said biasing means substantially ineffective, thereby causing a flow of current from said energy storing device through said electroresponsive device.

16. In combination, a direct current energized circuit including a resistance connected in series with an electrical energy storing device, an electron discharge device connected across said energy storing device, said discharge device being substantially electrically non-conducting until a voltage of a predetermined value is impressed thereon, the voltage of said circuit being sufficiently high to charge said energy storing device until the voltage impressed on said discharge device equals said predetermined value, an electrically conducting electroresponsive device connected across said energy storing device, biasing means for making said electroresponsive device substantially electrically non-conducting, means responsive to a flow of current through said discharge device for making said biasing means substantially ineffective, thereby causing a flow of current from said energy storing device through said electroresponsive device, and means responsive to the flow of current through said electroresponsive device for maintaining the flow of current therethrough after said discharge device has become substantially electrically non-conducting and until the voltage impressed on the latter has decreased a predetermined amount below said predetermined value.

17. A stroboscope comprising a direct current energized circuit including a resistance connected in series with a condenser, a glow tube connected across said condenser, said glow tube having a critical lighting voltage and a lower critical extinction voltage, the voltage of said circuit being sufficiently high to charge said condenser until the voltage impressed on said glow tube equals said critical lighting voltage, an electrically conducting electroresponsive device connected across said condenser, biasing means for making said eletroresponsive device substantially electrically non-conducting, means responsive to a flow of current through said glow tube for making said biasing means substantially ineffective, thereby causing a flow of current from said condenser through said electroresponsive device, and means for adjusting the amount of said resistance connected in series with said condenser so as to vary the frequency at which said glow tube flashes.

18. A stroboscope comprising a direct current energized circuit including a resistance connected in series with a condenser, a glow tube connected across said condenser, said glow tube having a critical lighting voltage and a lower critical extinction voltage, the voltage of said circuit being sufficiently high to charge said condenser until the voltage impressed on said glow tube equals said critical lighting voltage, an electron discharge device having an anode, a cathode and a grid, means for connecting said anode and cathode across said condenser, means for impressing across said cathode and grid a biasing voltage of sufficient magnitude to make said discharge device substantially electrically non-conducting, means responsive to a flow of current through said tube for impressing across said cathode and grid a voltage of sufficient magnitude in opposition to said biasing voltage to make said discharge device electrically conducting, thereby causing a flow of current from said condenser through said discharge device, and means for adjusting the amount of said resistance connected in series with said condenser so as to vary the frequency at which said glow tube flashes.

19. A stroboscope comprising a direct current energized circuit including a resistance connected in series with a condenser, a glow tube connected across said condenser, said glow tube having a critical lighting voltage and a lower critical extinction voltage, the voltage of said circuit being sufficiently high to charge said condenser until the voltage impressed on said glow tube equals said critical lighting voltage, an electron discharge device having an anode, a cathode and a grid, means for connecting said anode and cathode across said condenser, means for impressing across said cathode and grid a biasing voltage of sufficient magnitude to make said discharge device substantially electrically non-conducting, means responsive to a flow of current through said tube for impressing across said cathode and grid a voltage of sufficient magnitude in opposition to said biasing voltage to make said discharge device electrically conducting, thereby causing a flow of current from said condenser through said discharge device, a transformer having its primary winding connected in series with said cathode and its secondary winding connected in series with said grid, the transformer windings being so arranged that the voltage induced in its secondary winding at the instant said discharge device becomes electrically conducting impresses across said cathode and grid a voltage which opposes said biasing voltage, and means for adjusting the amount of said resistance connected in series with said condenser so as to vary the frequency at which said glow tube flashes.

20. A stroboscopic tachometer comprising a non-transparent casing having a wall provided with a transparent section, a spindle rotatably mounted in said casing, a mirror within said casing driven in a circular path by said spindle, an electric glow tube having a critical lighting voltage and a lower critical extinction voltage, said glow tube being so positioned adjacent said wall that when it glows it projects a column of light into said casing through said transparent section with some of its rays impinging on said mirror irrespective of the position in which the latter happens to be in its circular path, said mirror being so mounted that it reflects a beam of light which travels in said casing along a different path from that traveled by said column of light, said casing being provided with means for conducting said reflected beam of light out of the casing so that it moves over the arc of a circle as it emerges from the casing during the period rays from a column of light impinge on said mirror, a direct current energized circuit including a resistance connected in series with a condenser, means for connecting said glow tube across said condenser, the voltage of said circuit being sufficiently high to charge said condenser until the voltage impressed on said glow tube equals said critical lighting voltage, an electrically conducting electroresponsive device connected across said condenser, biasing means for making said electroresponsive device substantially electrically non-conducting, means responsive to a flow of current through said glow tube for making said biasing means substantially ineffective, thereby causing a flow of current from said condenser through said electroresponsive device, and means for adjusting the amount of said resistance connected in series with said condenser.

21. A stroboscope comprising a non-transparent casing, a spindle rotatably mounted in said casing, a rotatable disc within said casing driven by said spindle, an electric glow tube for periodically projecting a column of light into said casing which impinges on said disc, said glow tube having a critical lighting voltage and a lower critical extinction voltage, said casing and disc being provided with means for effecting the passage of a beam of light from said column of light out of the casing each time a column of light is projected thereinto with this beam of light moving over the arc of a circle in synchronism with the rotation of said disc as it emerges from said casing during the period a column of light is impinging on said disc, a direct current energized circuit including a resistance connected in series with a condenser, means for connecting said glow tube across said condenser, and means for adjusting the amount of said resistance connected in series with said condenser.

JOSEPH K. LEIBING.